(12) United States Patent
Fujimoto

(10) Patent No.: US 6,378,899 B1
(45) Date of Patent: Apr. 30, 2002

(54) AIRBAG CONTROL APPARATUS

(75) Inventor: Osamu Fujimoto, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/533,101

(22) Filed: Mar. 22, 2000

(30) Foreign Application Priority Data

Mar. 23, 1999 (JP) .......................................... 11-078229

(51) Int. Cl.[7] ................................................ B60R 21/32
(52) U.S. Cl. ..................................... 280/735; 70/279.1
(58) Field of Search ................................ 280/735, 734, 280/701, 45; 70/279.1, 280, 181–187

(56) References Cited

U.S. PATENT DOCUMENTS

| 4,189,708 | A | * | 2/1980 | Bryll | 340/64 |
|---|---|---|---|---|---|
| 4,426,864 | A | * | 1/1984 | Morikawa | 70/431 |
| 4,633,688 | A | * | 1/1987 | Beudat et al. | 70/279 |
| 4,916,927 | A | * | 4/1990 | O'Connell et al. | 70/276 |
| 5,232,243 | A | * | 8/1993 | Blackburn et al. | 280/732 |
| 5,307,658 | A | * | 5/1994 | Kokubu et al. | 70/427 |
| 5,324,074 | A | | 6/1994 | Christian et al. | |
| 5,542,274 | A | * | 8/1996 | Thordmark et al. | 70/495 |
| 5,544,914 | A | * | 8/1996 | Borninski et al. | 280/735 |
| 5,612,876 | A | | 3/1997 | Zeidler et al. | |
| 5,803,491 | A | * | 9/1998 | Barnes et al. | 280/735 |
| 5,816,611 | A | | 10/1998 | Parn | |
| 5,826,450 | A | * | 10/1998 | Lerchner et al. | 70/278 |
| 5,992,880 | A | | 11/1999 | Cuddihy et al. | |
| 6,040,637 | A | * | 3/2000 | Paganini et al. | 307/10.1 |
| 6,070,115 | A | * | 5/2000 | Ostreicher et al. | 701/45 |
| 6,133,648 | A | * | 10/2000 | Titus et al. | 307/10.2 |
| 6,189,923 | B1 | * | 2/2001 | Tsubone | 280/735 |

FOREIGN PATENT DOCUMENTS

| JP | A-8-34310 | | 2/1996 | |
|---|---|---|---|---|
| JP | A-8-318814 | | 12/1996 | |
| JP | 1120601 | * | 6/1997 | B60R/21/32 |
| JP | A-9-156461 | | 6/1997 | |
| JP | A-11-227558 | | 8/1999 | |

* cited by examiner

Primary Examiner—Lanna Mai
Assistant Examiner—Paul Royal, Jr.
(74) Attorney, Agent, or Firm—Oliff & Berridge, PLC

(57) ABSTRACT

In an airbag control apparatus, a control circuit is connected to a motor. Upon detecting a seated occupant having a body build equal to or greater than a predetermined value based on a value detected by a seat load sensor, the control circuit operates the motor in a predetermined direction to forcibly switch a manual cutoff switch from an OFF position to an ON position, and then locks the motor to prevent the manual cutoff switch from being switched to the OFF position.

17 Claims, 8 Drawing Sheets

AIRBAG CONTROL APPARATUS

INCORPORATION BY REFERENCE

The disclosure of Japanese Patent Application No. HEI 11-78229 filed on Mar. 23, 1999 including the specification, drawings and abstract is incorporated herein by reference in its entirety.

BACKGROUND OF THE INVENTION

1. Field of the Invention

The present invention relates to an airbag control apparatus and, more particularly, to an airbag control apparatus having a manual cutoff switch that can be manually operated to bring an airbag apparatus installed in a vehicle into an ineffective state.

2. Description of the Related Art

Japanese Patent No. 2753968 (U.S. Pat. No. 5,612,876) and Japanese Patent Application Laid-Open No. HEI 8-216825 disclose technologies for bringing a passenger seat-side airbag apparatus into an ineffective (activation-prevented) state when a child or a child seat occupies a passenger seat of a motor vehicle.

An airbag control apparatus of JP No. 2753968 is capable of changing an airbag apparatus between a normally effective (standby) state and an ineffective state by detecting the weight of a vehicle occupant on a seat cushion through the use of a seat load sensor provided in the seat cushion. In an airbag control apparatus of Japanese Patent Application Laid-Open No. HEI 8-216825, a manual cutoff switch is provided in an airbag ignition circuit. By manually operating the manual cutoff switch, an airbag apparatus can be changed between a normally effective state and an ineffective state.

However, in the airbag control apparatus of JP No. 2753968, there exist areas in which the detection by the seat load sensor provided in the seat cushion is difficult, that is, generally termed gray zones. Therefore, there is a possibility that even though an adult actually is present on the seat cushion, it will be determined that an adult is not seated on the seat cushion, and therefore the airbag apparatus will be switched to the ineffective state, depending on the sitting posture of the adult occupant. In the airbag control apparatus of Japanese Patent Application Laid-Open No. HEI 8-216825, the manual cutoff switch can be operated at will by an occupant. Therefore, there is a possibility of a false or inadvertent operation of the manual cutoff switch, that is, there is a possibility that the airbag apparatus will be in the ineffective state in a case where the apparatus actually needs to be in the normally effective state, or that the airbag apparatus will be in the normally effective state in a case where the apparatus actually needs to be in the ineffective state.

SUMMARY OF THE INVENTION

Accordingly, it is an object of the invention to provide an airbag control apparatus capable of preventing inadvertent operation of a manual cutoff switch and therefore preventing inadvertent activation of an airbag apparatus.

In accordance with the invention, an airbag control apparatus includes a manual cutoff switch for changing an airbag apparatus between an effective state and an ineffective state in accordance with a will of an occupant, an occupant-detecting sensor that detects presence or absence of a seated occupant or a body build of the seated occupant, and a control device for changing the airbag apparatus between the effective state and the ineffective state by controlling the manual cutoff switch in accordance with a detection signal from the occupant-detecting sensor.

This airbag control apparatus is able to change the airbag apparatus between the effective state and the ineffective state by the control device controlling the manual cutoff switch in accordance with the detection signal from the occupant-detecting sensor. Therefore, the airbag control apparatus is able to prevent inadvertent activation of the airbag apparatus due to inadvertent or false operation of the manual cutoff switch.

In the airbag control apparatus of the invention, the control device may allow the manual cutoff switch to be switched to an ineffective side only when a state with no occupant or with an occupant having a body build less than a predetermined body build is detected by the occupant-detecting sensor.

Therefore, since the manual cutoff switch is allowed to be switched to the ineffective side only when the state with no occupant or with an occupant having a body build less than the predetermined body build is detected by the occupant-detecting sensor, it becomes impossible to switch the manual cutoff switch to the ineffective side in a condition where the airbag apparatus needs to be effective. Hence, the airbag apparatus can be reliably activated when the activation of the airbag apparatus is actually needed.

The airbag control apparatus of the invention may further include a lock mechanism that prevents the manual cutoff switch from being switched to an effective side when a state with no occupant or with an occupant having a body build less than a predetermined body build is detected by the occupant-detecting sensor.

Therefore, since the lock mechanism prevents the manual cutoff switch from being switched to the effective side when the state with no occupant or with an occupant having a body build less than the predetermined body build is detected by the occupant-detecting sensor, it becomes impossible to switch the manual cutoff switch to the effective side in a condition where it is desirable that the airbag apparatus be ineffective. Hence, the inadvertent activation of the airbag apparatus due to inadvertent operation of the manual cutoff switch can be prevented.

The airbag control apparatus of the invention may further include a lock mechanism that prevents the manual cutoff switch from being switched to the ineffective side when an occupant having a body build equal to or greater than the predetermined body build is detected by the occupant-detecting sensor.

Therefore, since the lock mechanism prevents the manual cutoff switch from being switched to the ineffective side when an occupant having a body build equal to or greater than the predetermined body build is detected by the occupant-detecting sensor, it becomes impossible to switch the manual cutoff switch to the ineffective side in a condition where the airbag apparatus needs to be effective. Hence, the inadvertent activation of the airbag apparatus due to inadvertent operation of the manual cutoff switch can be prevented.

The airbag control apparatus of the invention may further include a forcibly switching mechanism that forcibly switches the manual cutoff switch from the ineffective side to an effective side when an occupant having a body build equal to or greater than the predetermined body build is detected by the occupant-detecting sensor.

In this construction, when an occupant having a body build equal to or greater than the predetermined body build is detected by the occupant-detecting sensor, the forcibly switching mechanism forcibly switches the manual cutoff switch from the ineffective side to the effective side. Therefore, if the manual cutoff switch should be at the ineffective side in a condition where the airbag apparatus needs to be effective, the forcibly switching mechanism will forcibly switch the manual cutoff switch from the ineffective side to the effective side, so that the air-fuel ratio can be properly activated.

The airbag control apparatus of the invention may further include a forcibly switching mechanism that forcibly switches the manual cutoff switch from an effective side to the ineffective side when a state with no occupant or with an occupant having a body build less than the predetermined body build is detected by the occupant-detecting sensor.

In this construction, when the state with no occupant or with an occupant having a body build less than the predetermined body build is detected by the occupant-detecting sensor, the forcibly switching mechanism forcibly switches the manual cutoff switch from the effective side to the ineffective side. Hence, if the manual cutoff switch should be at the effective side in a condition where it is desirable that the airbag apparatus be ineffective, the manual cutoff switch will be forcibly switched from the effective side to the ineffective side.

In the airbag control apparatus of the invention, the occupant-detecting sensor may be a seat load sensor that is provided in a seat cushion and that is capable of detecting weights in three ranges.

Therefore, it becomes possible to discriminate a state with no occupant, a state with an occupant having a body build less than the predetermined body build, and a state with an occupant equal to or greater than the predetermined body build. Hence, in accordance with a signal discriminating the three states from one another, whether to deploy an airbag body or not can be selected. Furthermore, in accordance with such a signal, the manner of deploying the airbag body can be controlled.

Furthermore, in the airbag control apparatus of the invention, the manual cutoff switch may be operated by using an ignition key, and may include a key cylinder that has an ON position where the airbag apparatus is normally effective, and an OFF position where the airbag apparatus is normally ineffective.

Therefore, since the manual cutoff switch is constructed so as to be operated by using an ignition key, the manual cutoff switch can be operated substantially only before the engine is started, and inadvertent operation of the manual cutoff switch in other occasions, for example, during driving, is prevented.

Still further, in the airbag control apparatus of the invention, the manual cutoff switch may be operated by using an ignition key, and may include a key cylinder that has an ON position where the airbag apparatus is normally effective, an OFF position where the airbag apparatus is normally ineffective, and an AUTO position where the airbag apparatus is controlled based on the detection signal from the occupant-detecting sensor.

Therefore, since the manual cutoff switch is constructed so as to be operated by using an ignition key, the manual cutoff switch can be operated substantially only before the engine is started, and inadvertent operation of the manual cutoff switch in other occasions, for example, during driving, is prevented. Besides, since the manual cutoff switch has three positions, the freedom in selection is increased.

The airbag control apparatus of the invention may further include an information-indicating device for, when the manual cutoff switch is at the AUTO position, indicating whether the airbag apparatus is in the effective state or the ineffective state.

With regard to the occupant-detecting sensor, there normally exist broad gray zones where the precision of detection by the occupant-detecting sensor is not sufficient. Therefore, there is a possibility that even though an occupant having a body build equal to or greater than the predetermined body build is seated, the airbag apparatus may be made ineffective depending on the sitting posture of the occupant, the motion of the occupant's hands, or the like. However, in the above-described construction, when the manual cutoff switch is at the AUTO position, the information-indicating device is activated to indicate whether the airbag apparatus is in the effective state or the ineffective state. Therefore, through the information-indicating device, an occupant can check whether the detection by the occupant-detecting sensor is correct or incorrect. That is, it becomes possible to advise an occupant to switch the manual cutoff switch to a proper position if necessary.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A first embodiment of the airbag control apparatus of the invention will be described with reference to FIGS. 1 to 5.

Figure 1:
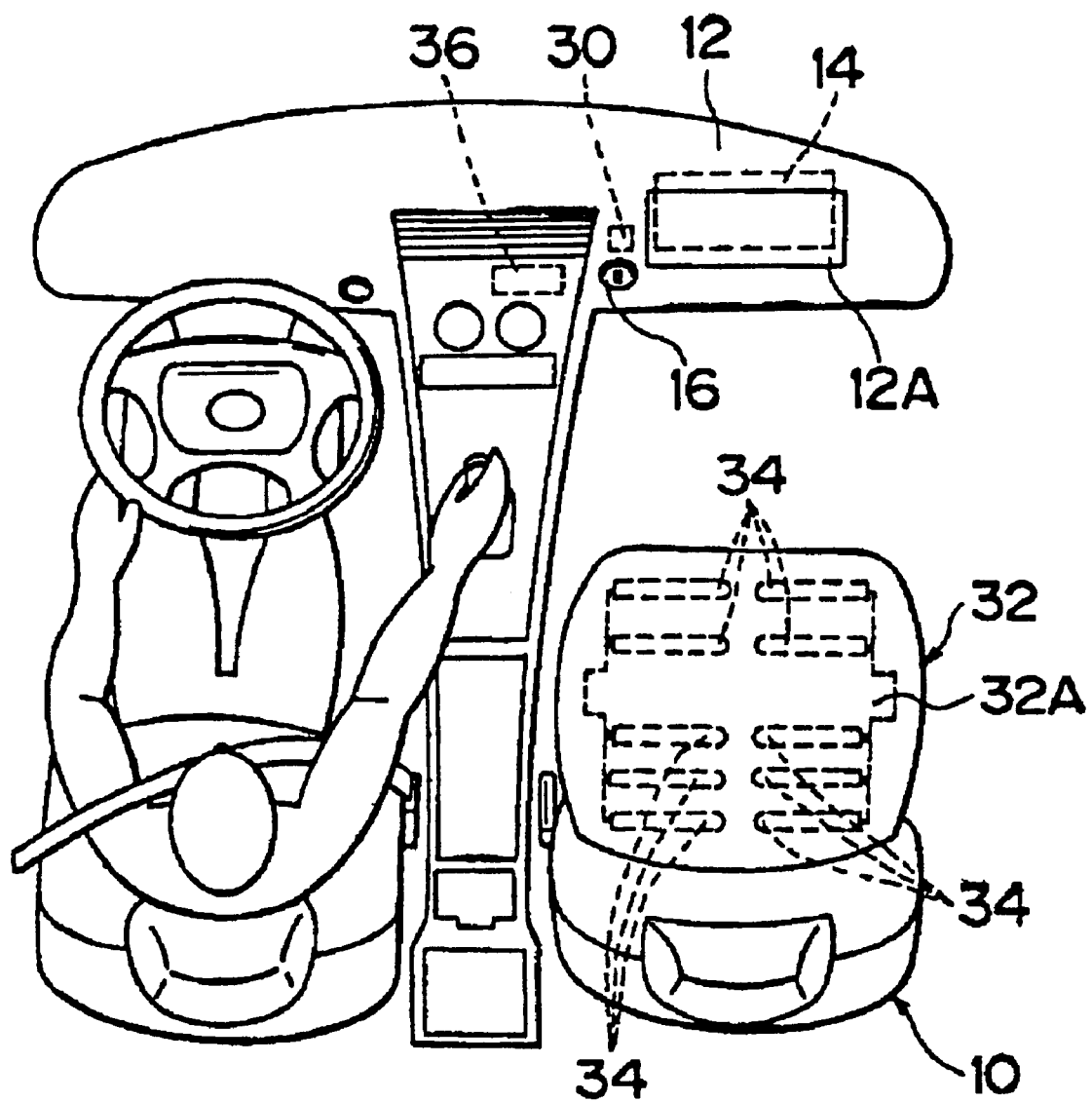
FIG. 1 is a schematic plan view of a forward portion of a compartment of a vehicle to which an airbag control apparatus according to a first embodiment of the invention is applied.

Referring to FIG. 1, an airbag apparatus 14 is housed in an instrument panel 12 provided forward of a passenger seat 10 in a vehicle according to this embodiment. An airbag door portion 12A formed in the instrument panel 12 has a generally rectangular shape that is elongated in a direction of a width of the vehicle. An airbag body forming a portion of the airbag apparatus 14 is inflated to a predetermined volume by gas jetted out upon activation of an inflator (not shown) that forms a portion of the airbag apparatus 14. The airbag body thereby breaks the airbag door portion 12A, and deploys into a compartment.

A manual cutoff switch 16 is disposed at a site in the instrument panel 12 that allows the manual cutoff switch 16 to be manually operated from a driver's seat, for example, at a site in the instrument panel 12 that is at an inner side of the airbag door portion 12A in the direction of the width of the vehicle.

Figure 2:
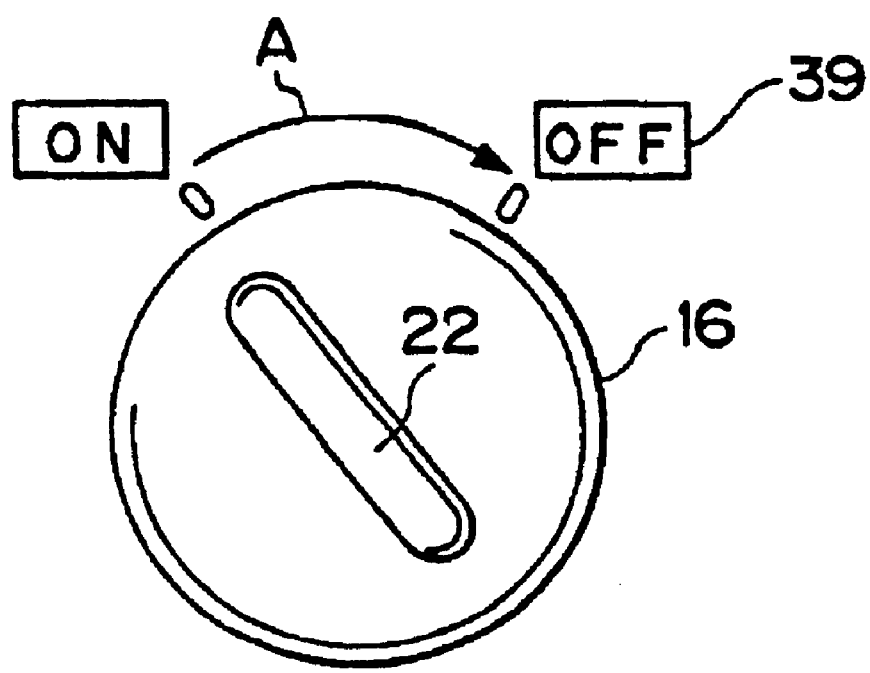
FIG. 2 is a front view of a manual cutoff switch provided in the airbag control apparatus of the first embodiment of the invention.

Referring to FIG. 2, the manual cutoff switch 16 is operated by using an ignition key 22. The manual cutoff switch 16 is selectively changeable between an ON position for a normally effective state of the airbag apparatus (where the airbag apparatus 14 is effective) and an OFF position for a normally ineffective state of the airbag apparatus (where the airbag apparatus 14 is ineffective).

Figure 3:
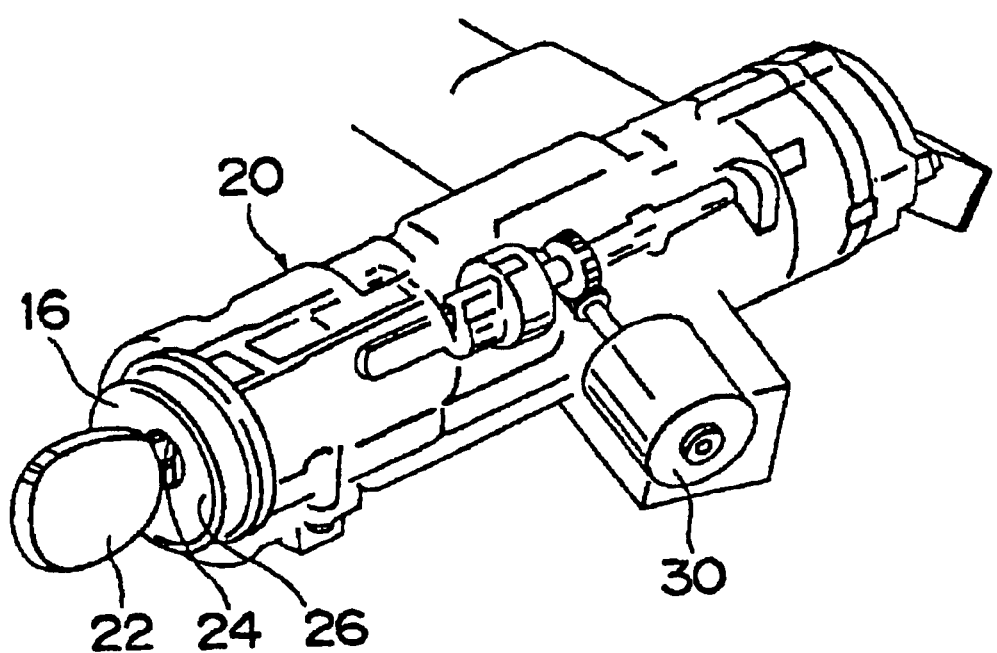
FIG. 3 is a perspective view of the manual cutoff switch provided in the airbag control apparatus of the first embodiment of the invention.

Referring to FIG. 3, the manual cutoff switch 16 is formed by a key cylinder 20. The key cylinder 20 has a key insert opening 24 into which the ignition key 22 is inserted, a rotor 26 that turns as the ignition key 22 inserted in the key insert opening 24 is turned, and a motor 30 provided as a lock mechanism that forms a portion of a control device for restricting the turning of the rotor 26.

In short, the airbag apparatus 14 is made effective by turning the ignition key 22 inserted in the key insert opening 24 to the ON position (see FIG. 2) The airbag apparatus 14 is made ineffective by turning the ignition key 22 in a direction indicated by an arrow A in FIG. 2 to the OFF position.

Referring back to FIG. 1, a seat load sensor 34 is disposed, as an occupant detecting sensor, in a seating portion 32A of a seat cushion 32 of the passenger seat 10. The seat load sensor 34 is formed by well-known pressure-sensitive film seat sensors for detecting a load acting on the seat cushion 32. The seat load sensor 34 is designed so as to discriminate three ranges of the seat load, more specifically, the weight of an occupant seated on the passenger seat 10. That is, the seat load sensor 34 is designed so as to discriminate a no-occupant state (for example, the load being less than 2 kg), an occupant having a body build less than a predetermined value (a child, or a child seat, for example, the load being equal to or greater than 2 kg but less than 30 kg), and an occupant having a body build equal to or more than the predetermined value (an adult, for example, the load being equal to or greater than 30 kg).

Figure 4:
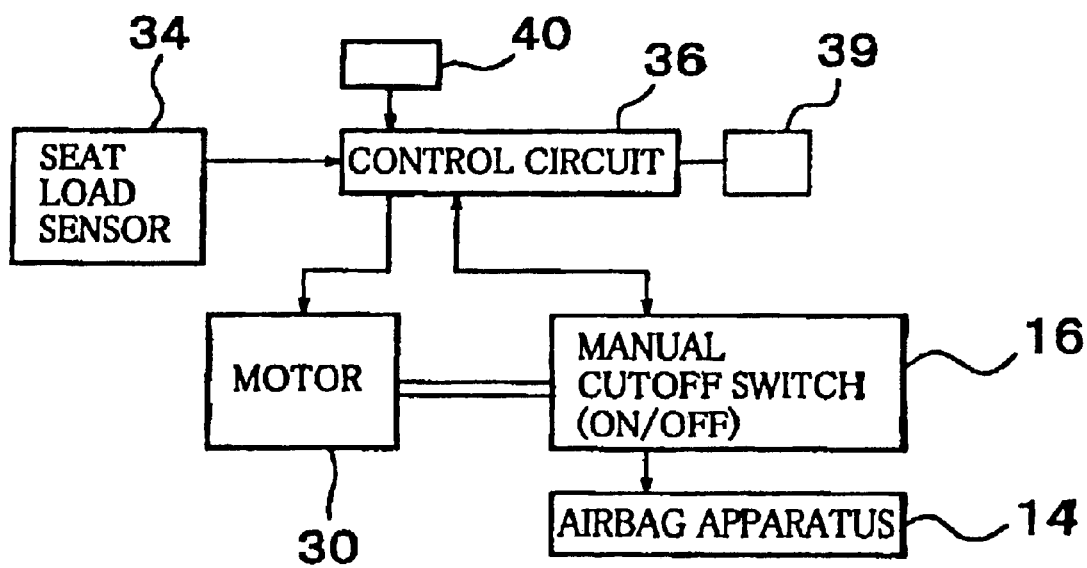
FIG. 4 is a block diagram illustrating the airbag control apparatus of the first embodiment of the invention.

Referring to FIG. 4, the seat load sensor 34 is connected to a control circuit 36 that forms a portion of the control device. The control circuit 36 is connected to the airbag apparatus 14 via the manual cutoff switch 16. Therefore, when the manual cutoff switch 16 is at the ON position, a control signal is allowed to be transmitted from the control circuit 36 to the airbag apparatus 14. When the manual cutoff switch 16 is at the OFF position, the control signal is prevented from being transmitted from the control circuit 36 to the airbag apparatus 14.

The control circuit 36 is also connected to the motor 30. Only when the control circuit 36 determines, based on a value detected by the seat load sensor 34, that a state with no occupant or an occupant having a body build less than the predetermined value is detected, the control circuit 36 unlocks the motor 30 to allow the manual cutoff switch 16 to be turned to the OFF position (position for the normally ineffective state of the airbag apparatus). When the control circuit 36 determines, based on the value detected by the seat load sensor 34, that an occupant having a body build equal to or greater than the predetermined value is detected, the control circuit 36 operates the motor 30 in a predetermined direction to forcibly switch the manual cutoff switch 16 from the OFF position to the ON position (for the normally effective state of the airbag apparatus). Thus, the control circuit 36 also functions as a forcibly switching mechanism that forms a portion of the control device.

An acceleration sensor 40 for detecting the acceleration of the vehicle is connected to the control circuit 36. Therefore, when the acceleration detected by the acceleration sensor 40 exceeds a predetermined value, the control circuit 36 determines that the vehicle has entered a sharply decelerating state. When it is determined that vehicle has entered the sharply decelerating state, the control circuit 36 outputs a signal for activating the airbag apparatus 14.

The operation of the embodiment will be described in detail with reference to the flowchart shown in FIG. 5.

In this embodiment, when an occupant inserts the ignition key 22 into an ignition-turning-on key cylinder (not shown) while the manual cutoff switch 16 remains at the OFF position, the control circuit 36 and the like are supplied with power. Then, the control circuit 36 reads an output signal of the seat load sensor 34 in step (hereinafter, referred to as "S") 100 in the flowchart of FIG. 5. Subsequently in S102, the control circuit 36 determines whether the seat cushion 32 is in a state with no occupant or an occupant having a body build less than the predetermined value, based on the output signal of the seat load sensor 34.

If it is determined in S102 that the seat cushion 32 is not in the state with no occupant or an occupant having a body build less than the predetermined value (NO in S102), that is, if it is determined that an occupant having a body build equal to more than the predetermined value is seated, the control circuit 36 proceeds to S104, in which the control circuit 36 starts a timer Ta and resets a timer Tb in order to prevent a false detection caused by the chattering among the sensors caused by oscillations from the occupant or the like.

Subsequently in S106, the control circuit 36 determines whether the timer Ta indicates a predetermined length of time T3 or a longer time. If the determination is negative, the process returns to S100. When it is determined in S106 that the timer Ta indicates the predetermined length of time T3 or a longer time, the process proceeds to S107, in which the control circuit 36 determines whether the manual cutoff switch 16 is at the ON position (the effective state of the airbag apparatus). If it is determined in S107 that the manual cutoff switch 16 is not at the ON position, that is, if it is determined that the manual cutoff switch 16 is at the OFF position (corresponding to the ineffective state), the process proceeds to S108. In S108, the control circuit 36 operates the motor 30 to forcibly switch the manual cutoff switch 16 to the ON position (corresponding to the effective state), and then locks the motor 30. Subsequently in S110, the control circuit 36 brings the airbag apparatus 14 into the effective state. Conversely, if it is determined in S107 that the manual cutoff switch 16 is at the ON position, the process proceeds to S109, in which the control circuit 36 locks the motor 30, that is, locks the manual cutoff switch 16. Subsequently in S110, the control circuit 36 brings the airbag apparatus 14 into the effective state.

If it is determined in S102 that the seat cushion 32 is in the state with no occupant or an occupant having a body build less than the predetermined value (YES in S102), that is, if it is determined that no occupant, a child seat, or an occupant having a body build less than the predetermined value is present on the seat cushion 32, the process proceeds to S112, in which the control circuit 36 starts the timer Tb and rests the timer Ta (Ta=0). Subsequently in S114, the control circuit 36 determines whether the timer Tb indicates a predetermined length of time T1 or a longer time. If the determination is negative, the process returns to S100.

When it is determined in S114 that the timer Tb indicates the predetermined length of time T1 or a longer time, the process proceeds to S116, in which the control circuit 36 unlocks the motor 30. The process then proceeds to S118, in which the control circuit 36 determines whether the manual cutoff switch 16 is at the OFF position (the ineffective side). If it is determined in S118 that the manual cutoff switch 16 is not at the OFF position, that is, if it is determined that the manual cutoff switch 16 is at the ON position, a timer Tc is reset (Tc=0). Then, the process proceeds to step S110.

Conversely, if it is determined in S118 that the manual cutoff switch 16 is at the OFF position (YES in S118), the process proceeds to S120, in which the control circuit 36 reads the OFF position of the manual cutoff switch 16. Subsequently in S122, the control circuit 36 starts the timer Tc. Subsequently in step 124, the control circuit 36 determines whether the timer Tc indicates a predetermined length of time T2 or a longer time. If the determination in S124 is negative, the process returns to S118. When it is determined in S124 that the timer Tc indicates the predetermined length of time T2 or a longer time, the process proceeds to S126, in which the control circuit 36 brings the airbag apparatus 14 into the activation-prevented state.

Therefore, even after the engine is started while the manual cutoff switch 16 remains at the OFF position (the ineffective state of the airbag apparatus 14), the embodiment is able to forcibly bring the airbag apparatus 14 into the effective state in accordance with situation. That is, if the control circuit 36 determines, based on the output signal of the seat load sensor 34, that the seat is not in the state with no occupant or an occupant having a body build less than the predetermined value, that is, that an occupant having a body build equal to or greater than the predetermined value is seated, the control circuit 36 operates the motor 30 to switch the manual cutoff switch 16 to the ON position, and then locks the motor 30. Thus, the airbag apparatus 14 is forcibly brought into the effective state. Furthermore, the manual cutoff switch 16 is prevented from being switched to the OFF position (the ineffective side) in a condition where the airbag apparatus 14 needs to be in the effective state.

Therefore, if the vehicle enters a sharply decelerating state such that the control circuit 36 outputs the signal for activating the airbag apparatus 14, the airbag apparatus 14 is activated to inflate and deploy the airbag body.

In order to bring the airbag apparatus 14 into the activation-prevented state, for example, when a child seat (that is lighter than an occupant having a body build less than the predetermined value) is placed on the passenger seat 10, the manual cutoff switch 16 is inserted into the key insert opening 24, and is turned in the direction of the arrow A in FIG. 2 to the OFF position, and then is pulled out. Then, when an occupant inserts the ignition key 22 into the ignition-turning-on key cylinder (not shown) and the control circuit 36 and the like are electrified, the control circuit 36 determines that the seat is in the state with no occupant or an occupant having a body build less than the predetermined value (YES in S102) based on the output signal of the seat load sensor 34. As a result, the manual cutoff switch 16 is kept at the OFF position. Therefore, if the vehicle enters the sharply decelerating state, the activating signal outputted from the control circuit 36 does not reach the airbag apparatus 14, so that the airbag apparatus 14 is not activated, that is, the airbag body is not inflated for deployment.

Thus, in this embodiment, the manual cutoff switch 16 never remains at the ineffective side in a condition where the airbag apparatus 14 needs to be effective (i.e., where an occupant having a body build equal to or greater than the predetermined value is seated on the passenger seat 10). As a result, the airbag apparatus 14 can be reliably activated when the activation thereof is actually needed.

Furthermore, in the embodiment, the manual cutoff switch 16 is operated by using the ignition key 22. Therefore, the operation of the manual cutoff switch 16 is allowed only before the starting of the engine, and inadvertent operation of the manual cutoff switch 16 is prevented in other occasions, for example, during driving or the like.

Figure 5:
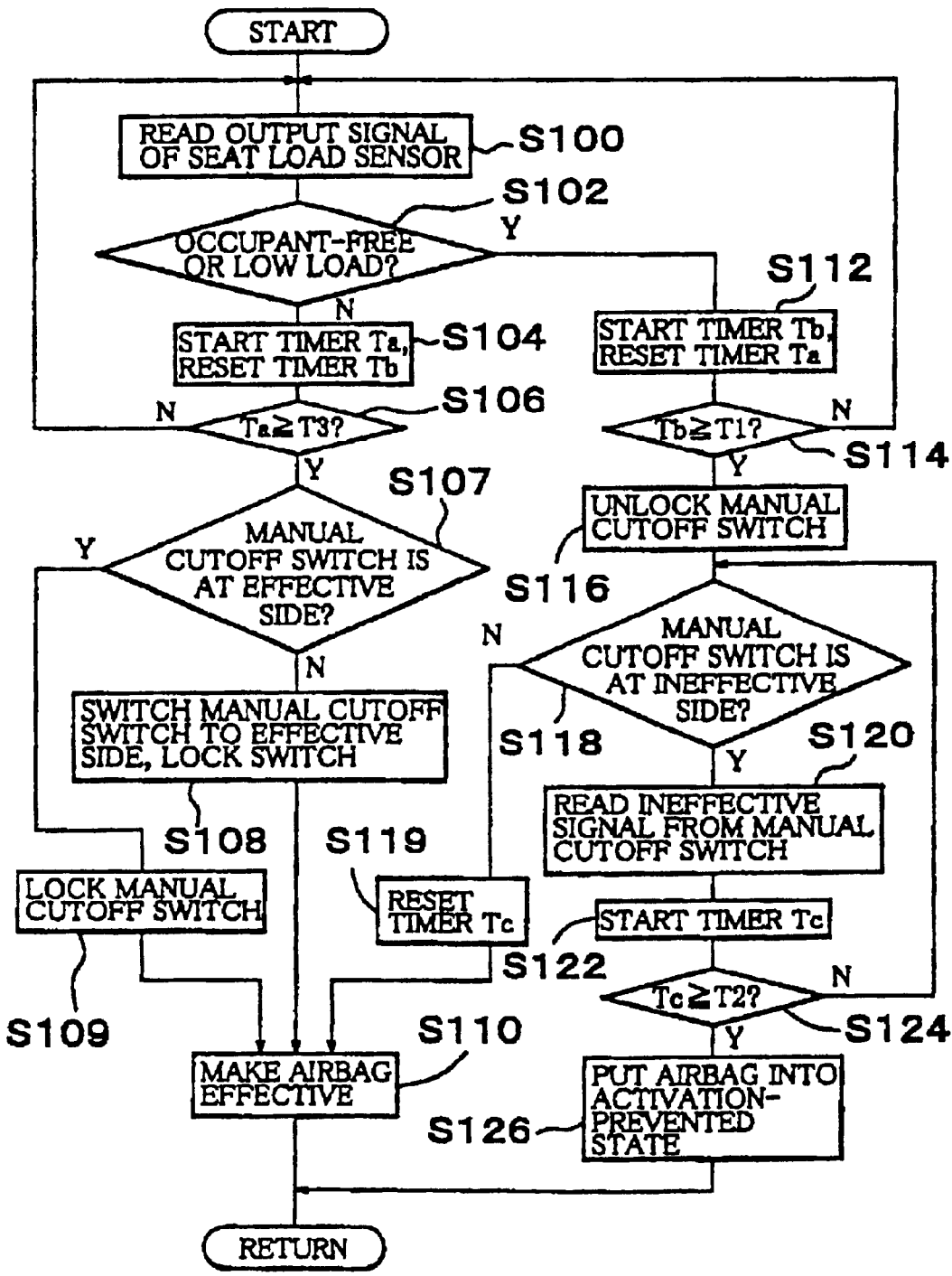
FIG. 5 is a flowchart illustrating a control operation performed by the airbag control apparatus according to the first embodiment of the invention.
Figure 6:
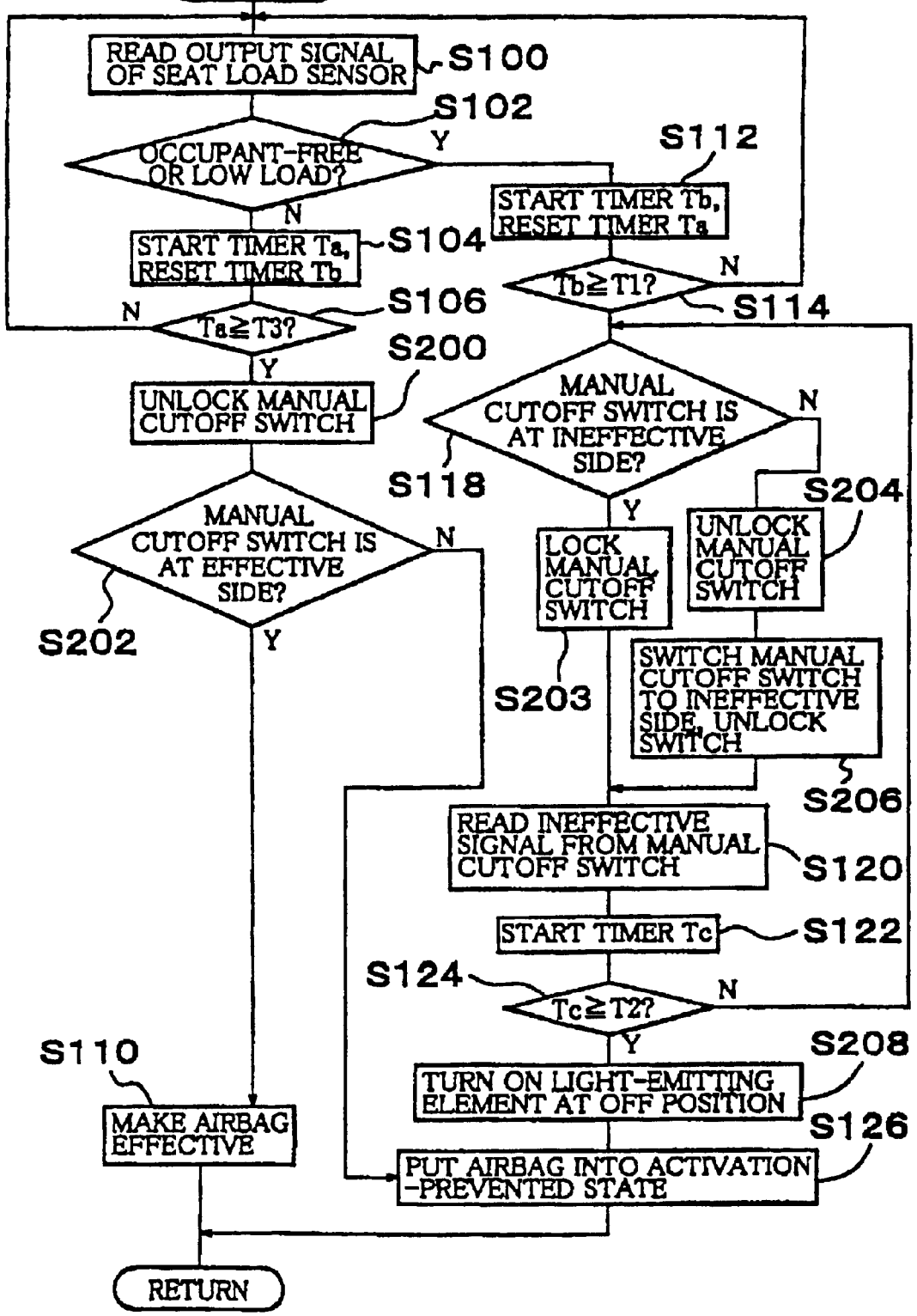
FIG. 6 is a flowchart illustrating a control operation performed by the airbag control apparatus according to a modification of the first embodiment of the invention.

The airbag control apparatus of the embodiment may be controlled as in the flowchart shown in FIG. 6, instead of the flowchart of FIG. 5.

In the flowchart of FIG. 6, the steps represented by the same numerals as used in the flowchart of FIG. 5 have the same processing contents as the corresponding steps in the flowchart in FIG. 5. Those steps will not be described in detail again.

If it is determined in S106 in the flowchart of FIG. 6 that the timer Ta indicates the predetermined length of time T3 or a longer time, the process proceeds to S200, in which the control circuit 36 unlocks the motor 30 to unlock the manual cutoff switch 16 (i.e., to make it switchable). After that, in S202, the control circuit 36 determines whether the manual cutoff switch 16 is at the effective side. If it is determined in S202 that the manual cutoff switch 16 is at the effective side, the process proceeds to S110.

Conversely, if it is determined in S202 that the manual cutoff switch 16 is not at the effective side, the process proceeds to S126, in which the control circuit 36 brings the airbag apparatus 14 into the activation-prevented state.

If it is determined in S118 that the manual cutoff switch 16 is not at the OFF position (not at the ineffective side), that is, if it is determined that the manual cutoff switch 16 is at the ON position, the process proceeds to S204, in which the control circuit 36 unlocks the motor 30. Subsequently in S206, the control circuit 36 operates the motor 30 to forcibly switch the manual cutoff switch 16 from the ON position (the effective side) to the OFF position (the ineffective side), and then locks the motor 30. The process then proceeds to S120.

Conversely, if it is determined in S118 that the manual cutoff switch 16 is at the OFF position (the ineffective side), the manual cutoff switch 16 is locked in S203. Then, the process proceeds to S120.

If it is determined in S124 that the timer Tc indicates the predetermined length of time T2 or a longer time, the process proceeds to S208, in which the control circuit 36 turns on a light-emitting element 39 (see FIG. 2), for example, a light-emitting diode or the like that is disposed corresponding to the OFF position of the manual cutoff switch 16. Subsequently in S126, the control circuit 36 brings the airbag apparatus 14 into the activation-prevented state.

Therefore, in this modification, the motor 30 prevents the manual cutoff switch 16 being switched to the effective side when the state with no occupant or an occupant having a body build less than the predetermined value has been detected by the seat load sensor 34. That is, in a condition where it is desirable that the airbag apparatus 14 be ineffective, the manual cutoff switch 16 cannot be switched to the effective side. Thus, the above-described modification achieves an advantage of preventing inadvertent activation of the airbag apparatus 14 due to inadvertent operation of the manual cutoff switch 16, in addition to the advantages achieved by the first embodiment.

If the seat load sensor 34 detects the state with no occupant or an occupant having a body build less than the predetermined value but the manual cutoff switch 16 is at the effective side, the manual cutoff switch 16 is forcibly switched from the effective side to the ineffective side by using the motor 30. Therefore, if the manual cutoff switch 16 should be at the effective side in a condition where it is desirable that the airbag apparatus 14 be ineffective, the manual cutoff switch 16 will be forcibly switched from the effective side to the ineffective side. Furthermore, by turning on the light-emitting element 39, the above-described modification is able to inform an occupant that the airbag apparatus 14 is in the activation-prevented state.

A second embodiment of the airbag control apparatus of the invention will be described with reference to FIGS. 7 and 8.

Members and portions of the second embodiment comparable to those of the first embodiment are represented by reference characters comparable to those used in the first embodiment, and will not be described again.

Figure 7:
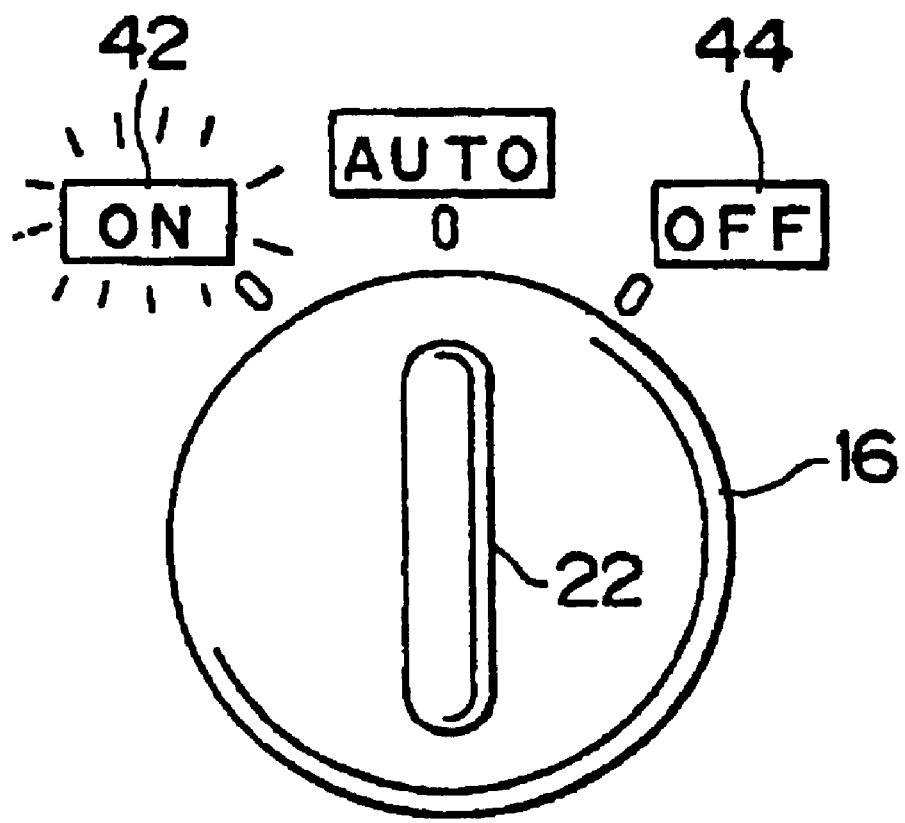
FIG. 7 is a front view of a manual cutoff switch provided in an airbag control apparatus according to a first embodiment of the invention.

Referring to FIG. 7, a manual cutoff switch 16 in this embodiment is operated by an ignition key 22, and is selectively changeable among three positions, that is, an ON position for a normally effective state of an airbag apparatus 14 (at which the airbag apparatus 14 is made effective), an OFF position for a normally ineffective state of the airbag apparatus 14 (at which the airbag apparatus 14 is made ineffective), and an AUTO position at which the airbag apparatus 14 is controlled based on a detection signal from a seat load sensor 34.

Indicator portions corresponding to the ON position and the OFF position are provided with light-emitting elements 42, 44, such as light-emitting diodes or the like, which serve as an information-indicating device. The light-emitting elements 42, 44 are connected to a control circuit 36 (see FIG. 8). When the manual cutoff switch 16 is set to the AUTO position by using the ignition key 22, the control circuit 36 operates the light-emitting elements 42, 44 as follows. That is, upon making the airbag apparatus 14 effective based on the detection signal from the seat load sensor 34, the control circuit 36 outputs an on-signal to the light-emitting element 42 disposed at the ON position to turn on the light-emitting element 42 in a steadily-on or flickering manner. Upon making the airbag apparatus 14 ineffective based on the detection signal from the seat load sensor 34, the control circuit 36 outputs an on-signal to the light-emitting element 44 disposed at the OFF position to turn on the light-emitting element 44 in a steadily-on or flickering manner. In this embodiment, the light-emitting element 42 disposed corresponding to the ON position produces blue light, and the light-emitting element 44 disposed corresponding to the OFF position produces red light.

Figure 8:
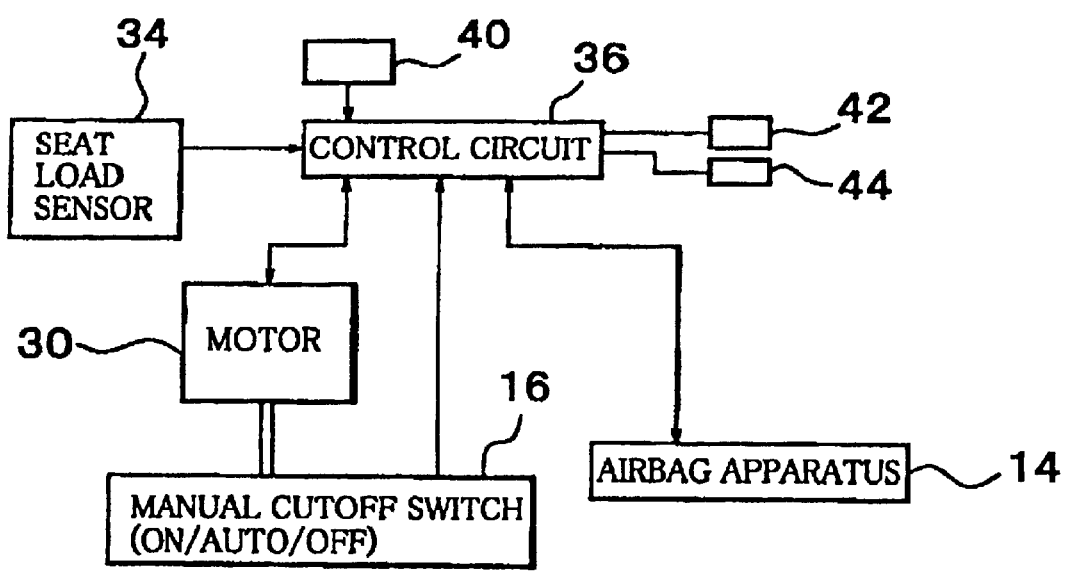
FIG. 8 is a perspective view of the manual cutoff switch provided in the airbag control apparatus of the second embodiment of the invention.

In this embodiment, the control circuit 36 is connected separately to the manual cutoff switch 16 and the airbag apparatus 14 as shown in FIG. 8. When the manual cutoff switch 16 is at the ON position, the control circuit 36 brings the airbag apparatus 14 into the normally effective state regardless of the detection signal from the seat load sensor 34. When the manual cutoff switch 16 is at the OFF position, the control circuit 36 brings the airbag apparatus 14 into the normally ineffective state regardless of the detection signal from the seat load sensor 34.

The operation of this embodiment will be described.

In this embodiment, the manual cutoff switch 16 is switchable among the three positions, that is, the ON position, the OFF position, and the AUTO position at which the airbag apparatus 14 is controlled based on the detection signal from the seat load sensor 34. Therefore, the freedom in the position selection of the manual cutoff switch 16 is increased. That is, when the manual cutoff switch 16 is set to the AUTO position, the embodiment allows the airbag apparatus 14 to be automatically switched between the normally effective state and the normally ineffective state.

Normally, the seating portion 32A of the seat cushion 32 has portions (gray zones) where the precision of detection by the seat load sensor 34 is not sufficient. Therefore, there is a possibility that even though an occupant having a body build equal to or greater than the predetermined value is seated, the airbag apparatus 14 may be made ineffective depending on the sitting posture of the occupant or the like. In the embodiment, however, when the control circuit 36 makes the airbag apparatus 14 effective based on the detection signal from the seat load sensor 34, the control circuit 36 outputs the on-signal to the light-emitting element 42 disposed at the ON position to turn on the light-emitting element 42 in a steadily-on or flickering manner. When the control circuit 36 makes the airbag apparatus 14 ineffective based on the detection signal from the seat load sensor 34, the control circuit 36 outputs the on-signal to the light-emitting element 44 disposed at the OFF position to turn on the light-emitting element 44 in a steadily-6n or flickering manner. The embodiment thus informs an occupant of the state of the manual cutoff switch 16 by turning on or flickering the light-emitting element 42 or 44.

As a result, an occupant can check whether the detection by the seat load sensor 34 is correct or incorrect, by visually checking the light-emitting element 42 disposed at the ON position of the manual cutoff switch 16 and the light-emitting element 44 disposed at the OFF position of the manual cutoff switch 16. That is, by turning on or flickering one of the light-emitting elements 42, 44, the embodiment is able to advise an occupant to switch the manual cutoff switch 16 to an appropriate position if the present position of the manual cutoff switch 16 is inappropriate. Thus, the embodiment is able to prevent inadvertent operation of the manual cutoff switch 16 and therefore prevents inadvertent activation of the airbag apparatus 14.

In this embodiment, if the seat load sensor 34 detects the state with no occupant, it is preferable to drive the motor 30 to switch the manual cutoff switch 16 to the AUTO position.

Although the specific embodiments of the invention are described above in detail, it should be apparent to those skilled in the art that the invention is not limited to the foregoing embodiments, but may also be embodied in various other forms within the scope of the invention. For example, although the foregoing embodiments employ, as an occupant-detecting sensor, the seat load sensor 34 formed by pressure-sensitive film seat sensors, it is also possible to use, instead of the seat load sensor 34, an electrostatic capacitance type sensor disposed in a seatback for measuring the sitting height of an occupant, or an image sensor, an infrared sensor or an ultrasonic sensor that is disposed in a roof, an instrument panel or the like, or other occupant-detecting sensors. Furthermore, although the embodiments discriminate the weight of an occupant sitting on the passenger seat 10 in the three ranges through the use of the seat load sensor 34 provided as an occupant-detecting sensor, the number of ranges discriminated is not limited to three, but may also be two, or four or more. Still further, although the foregoing embodiments employ the motor 30 as a lock device and a forcibly switching device, the motor 30 may be replaced by a solenoid or other actuators to form a lock device and a forcibly switching device. Further, although in the embodiments, the ON position and the OFF position of the manual cutoff switch 16 are provided with the light-emitting elements 42, 44, such as light-emitting diodes or the like, which serve as an information-indicating device, the construction of the information-indicating device and the installation position thereof are not restricted by the light-emitting elements 42, 44. For example, the ON position and the OFF position of the manual cutoff switch 16 may also be indicated in a control panel, or may also be indicated to an occupant by an alarm, voice, or the like. Furthermore, the manual cutoff switch 16 may also be formed by a push switch or the like. Still further, the airbag control apparatus of the invention is also applicable to a rear-seat airbag apparatus.

As mentioned above, the present invention is intended to cover not only the above-described embodiments or constructions but also various other modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An airbag control apparatus comprising:
   a manual cutoff switch for changing an airbag apparatus between an effective state and an ineffective state in accordance with a will of an occupant;
   an occupant-detecting sensor that detects presence or absence of a seated occupant or a body size of the seated occupant; and
   control means for changing the airbag apparatus between the effective state and the ineffective state by controlling the manual cutoff switch in accordance with a detection signal from the occupant-detecting sensor.

2. An airbag control apparatus according to claim 1, wherein the control means allows the manual cutoff switch to be switched to an ineffective side only when a state with no occupant or with an occupant having a body size less than a predetermined body size is detected by the occupant-detecting sensor.

3. An airbag control apparatus according to claim 1, further comprising a lock mechanism that prevents the manual cutoff switch from being switched to the ineffective side when an occupant having a body size equal to or greater than the predetermined body size is detected by the occupant-detecting sensor.

4. An airbag control apparatus according to claim 3, wherein the lock mechanism includes a motor, and the lock mechanism prevents the manual cutoff switch from being switched by locking the motor.

5. An airbag control apparatus according to claim 1, further comprising a control circuit that forcibly switches the manual cutoff switch from the ineffective side to an effective side when an occupant having a body size equal to or greater than the predetermined body size is detected by the occupant-detecting sensor.

6. An airbag control apparatus according to claim 5, wherein the control circuit includes a motor, and the control circuit forcibly switches the manual cutoff switch by driving the motor.

7. An airbag control apparatus according to claim 1, further comprising a lock mechanism that prevents the manual cutoff switch from being switched to an effective side when a state with no occupant or with an occupant having a body size less than a predetermined body size is detected by the occupant-detecting sensor.

8. An airbag control apparatus according to claim 7, wherein the lock mechanism includes a motor, and the lock mechanism prevents the manual cutoff switch from being switched by locking the motor.

9. An airbag control apparatus according to claim 7, further comprising a control circuit that forcibly switches the manual cutoff switch from the effective side to an ineffective side when the state with no occupant or with an occupant having a body size equal less than the predetermined body size is detected by the occupant-detecting sensor.

10. An airbag control apparatus according to claim 9, wherein the control circuit includes a motor, and the control circuit forcibly switches the manual cutoff switch by driving the motor.

11. An airbag control apparatus according to claim 1, wherein the occupant-detecting sensor is a seat load sensor that is provided in a seat cushion and that is capable of detecting weights in three ranges.

12. An airbag control apparatus according to claim 11, wherein the occupant-detecting sensor detects a state with no occupant, an occupant having a body size less than a predetermined body size, and an occupant having a body size equal to or greater than the predetermined body size, based on a weight.

13. An airbag control apparatus according to claim 1, wherein the manual cutoff switch is operated by using an ignition key, and includes a key cylinder that has an ON position where the airbag apparatus is normally effective, and an OFF position where the airbag apparatus is normally ineffective.

14. An airbag control apparatus according to claim 1, wherein the manual cutoff switch is operated by using an ignition key, and includes a key cylinder that has an ON position where the airbag apparatus is normally effective, an OFF position where the airbag apparatus is normally ineffective, and an AUTO position where the airbag apparatus is controlled based on the detection signal from the occupant-detecting sensor.

15. An airbag control apparatus according to claim 14, further comprising information-indicating means for, when the manual cutoff switch is at the AUTO position, indicating whether the airbag apparatus is in the effective state or the ineffective state.

16. An airbag control apparatus according to claim 15, wherein the information-indicating means includes a light-emitting element that indicates at least one of the effective state and the ineffective state of the airbag apparatus.

17. An airbag control apparatus according to claim 14, further comprising a forcibly switching mechanism that forcibly switches the manual cutoff switch to the AUTO position when a state with no occupant is detected by the occupant-detecting sensor.

* * * * *